United States Patent [19]

Itoh

[11] Patent Number: 5,140,253

[45] Date of Patent: Aug. 18, 1992

[54] CONTROL DEVICE FOR VEHICLE A.C. GENERATOR

[75] Inventor: Kenji Itoh, Hyogo, Japan

[73] Assignee: Mitsubishi Denki Kabushiki Kaisha, Tokyo, Japan

[21] Appl. No.: 461,953

[22] Filed: Jan. 8, 1990

[30] Foreign Application Priority Data

Jan. 9, 1989 [JP] Japan .................................. 1-2536

[51] Int. Cl.⁵ .............................................. H02J 7/14
[52] U.S. Cl. ......................................... 322/28; 322/25
[58] Field of Search .......................... 322/17, 22, 23, 24, 322/25, 27, 28

[56] References Cited

U.S. PATENT DOCUMENTS

| 3,983,471 | 9/1976 | Itoh et al. | 322/28 |
| 4,346,337 | 3/1982 | Watrous | 322/28 |
| 4,446,417 | 5/1984 | Fox et al. | 322/25 |
| 4,459,489 | 11/1984 | Kirk et al. | 322/8 X |
| 4,629,967 | 12/1986 | Voss | 322/28 |
| 4,634,954 | 1/1987 | Kato et al. | 322/28 |
| 4,680,529 | 7/1987 | Komurasaki et al. | 322/28 |
| 4,754,212 | 6/1988 | Mashino | 322/28 |
| 4,839,576 | 6/1989 | Kaneyuki et al. | 322/25 |

FOREIGN PATENT DOCUMENTS 0289608 7/1988 European Pat. Off. .
2933462 4/1980 Fed. Rep. of Germany .
137542 3/1988 Japan .

Primary Examiner—Steven L. Stephan
Assistant Examiner—Kristine Peckman
Attorney, Agent, or Firm—Sughrue, Mion, Zinn, Macpeak and Seas

[57] ABSTRACT

A control device for a motor vehicle alternating current generator for controlling a field current of the generator with use of voltage control circuitry and field current limiting circuitry, wherein a field current limiting value is varied successively based on the detected output voltage of the generator and the field current is increased smoothly upon an increased demand.

14 Claims, 3 Drawing Sheets

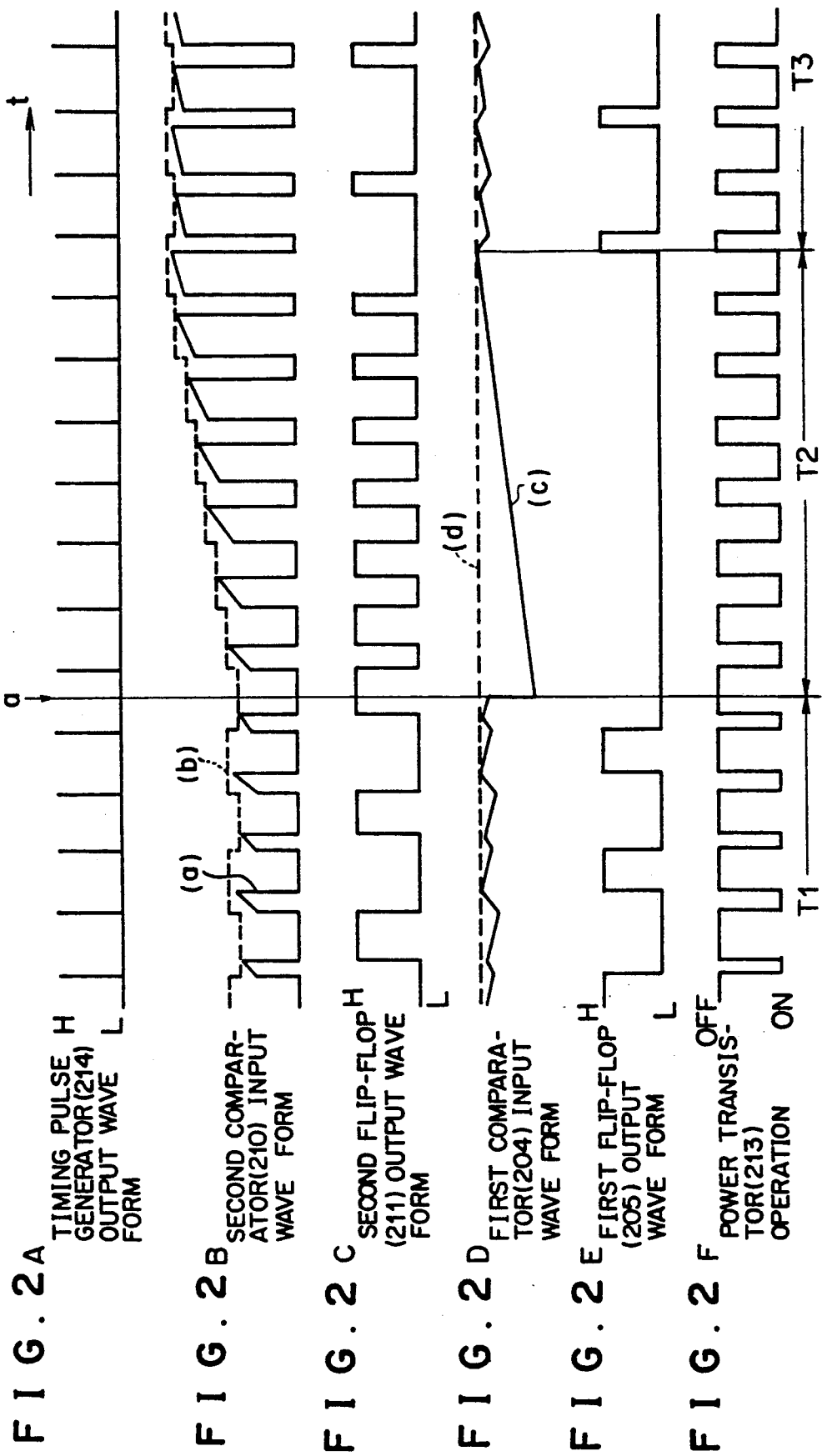

OUTPUT CURRENT(A) OF GENERATOR

FIELD CURRENT(A)

DRIVING TORQUE (kg-m)

RPM OF ENGINE (r.p.m)

b

CONTROL DEVICE FOR VEHICLE A.C. GENERATOR

BACKGROUND OF THE INVENTION

1. Field of the Invention

This invention relates to a control device for a vehicle generator and more particularly to a load responsive control device for an alternating current (AC) generator to be installed in a motor vehicle carrying a battery.

2. Description of the Prior Art

In a prior art control device for a motor vehicle alternating current generator, an output voltage of the generator or a voltage across a vehicle battery is divided by utilizing a voltage divider made up of resistors and the like, and a divided voltage is compared with an output voltage of a standard voltage generator a zener diode to generate a control signal. The output voltage of the generator is then regulated to keep a required value by switching a switching element connected in series with a field coil of the generator for controlling a field current that flows therethrough based on the detected control signal. That is, if the output voltage of the generator is higher than the set voltage, the switching element is turned off to decrease the field current whilst if it is lower than the set voltage, the switching element is turned on to increase the field current, whereby the output voltage of the generator is maintained at the set voltage. In such a control device of the type as described above, there is provided a continuous change of field current to follow up, with a time constant of the field coil (approximately 100 msec), a fluctuation of the required field current of the generator caused by a fluctuation of an electric load and the like, and a stabilized control of the battery voltage is attained through such response.

However, in the prior art system, because of such rapid response, an output current of the generator may change abruptly in a fluctuation period of an electric load, which may cause an abrupt change in driving torque (power). This in turn results in a problem of causing a change of the rotary speed of an engine, especially, in a range of idling of the engine whereby a driving power of the engine is decreased to a great extent. Therefore, a reciprocal increase of driving torque of the generator under such condition may cause serious problems.

It is therefore an object of this invention to solve the aforesaid problems and to prevent an abrupt change in driving torque of the generator caused when an electric load is applied thereon, to provide a control device capable of restraining a rotary fluctuation of the engine.

SUMMARY OF THE INVENTION

The present invention pertains to a control device which controls a field current with use of voltage control means and field current limiting means, whereby a field current limiting value in the field current limiting means is varied successively based on a detected output voltage of the generator and a field current is increased smoothly upon an increased demand. Accordingly, the control device in accordance with this invention comprises voltage detecting means for detecting an output voltage of an alternating current generator, voltage control means for controlling ON and OFF a switching element which interrupts a field current of the alternating current generator based on a detected signal attained by comparing an output of the voltage detecting means with a standard voltage, field current limiting means for controlling the switching element based on a detected signal attained by comparing an output of the field current detecting means with a predetermined field current limiting value, and field current limiting value adjusting means for varying the field current limiting value successively based on a state of the detected output of the voltage detecting means.

BRIEF DESCRIPTION OF THE DRAWING

FIGS. 2A-2F are a timing diagram showing the waveforms at the various parts of the embodiment of this invention shown in FIG. 1.

DESCRIPTION OF THE PREFERRED EMBODIMENT

Figure 1:
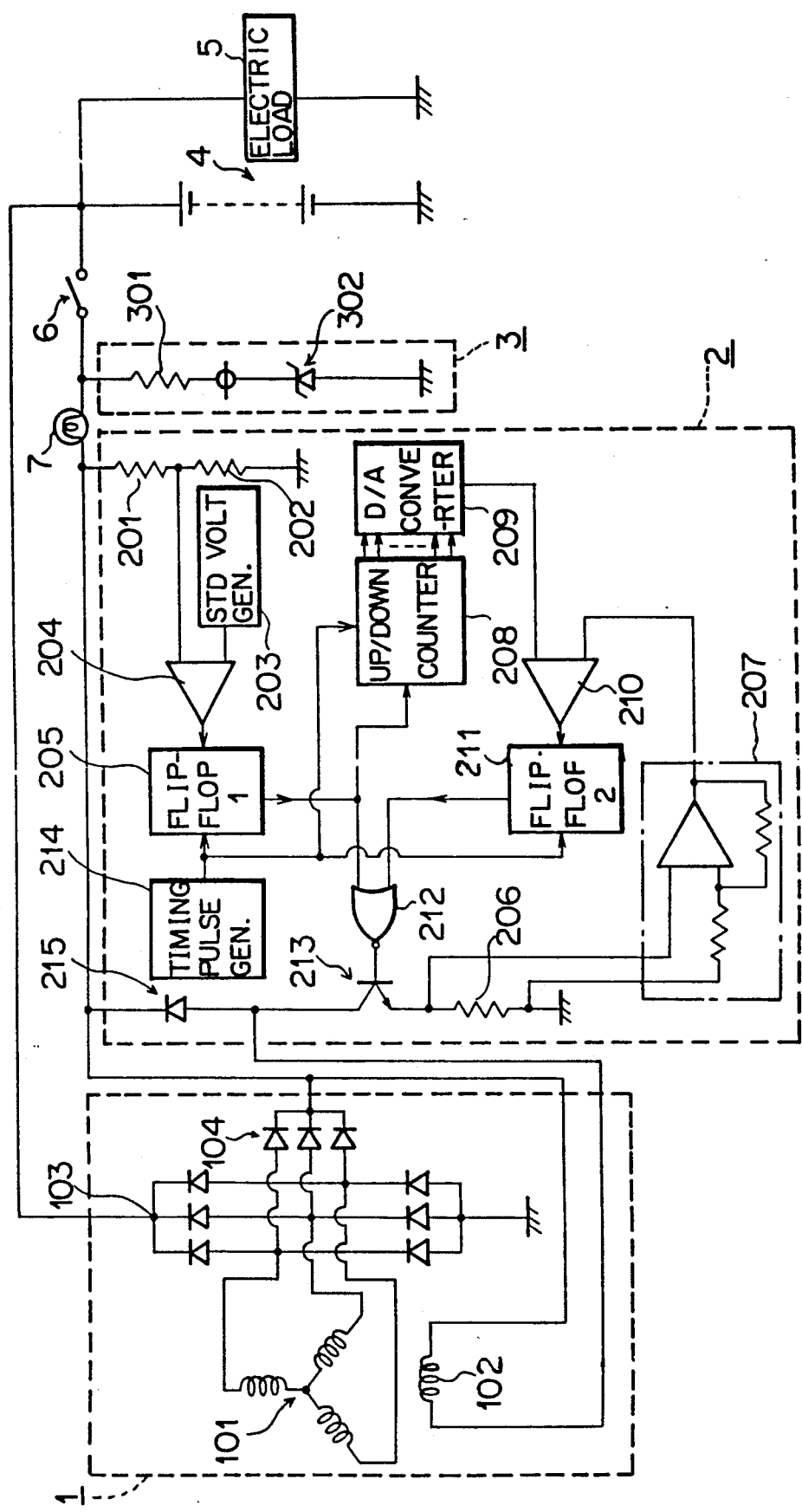
FIG. 1 is a schematic circuit diagram of a control device illustrating an embodiment of this invention.

A preferred embodiment of the invention will now be described more in detail with reference to the accompanying drawings. Referring to FIG. 1, there is shown a schematic circuit diagram of the control device made in accordance with the present invention, wherein, an alternating current generator 1 comprises armature coils 101, a field coil 102, a main rectifier 103 to perform three-phase full-wave rectification of the three-phase output generated at the armature coils 101, and an auxiliary rectifier 104 primarily for supplying a field current. A field current limiting unit is designated by numeral 2 and comprises a voltage divider consisting of resistors 201, 202 for dividing an output voltage of the auxiliary rectifier 104, a standard voltage generator 203 and a first comparator 204 for detecting an output of the generator 1, a first flip-flop circuit 205 for accepting an output of the first comparator 204 and connected to an input terminal of a NOR gate 212 and to an UP/DOWN counter switching input terminal of an UP/DOWN counter 208, a field current detecting resistor 206 for generating a voltage which is proportional to a field current, and a non-inverting amplifier 207 for amplifying a low voltage level at the field current detecting resistor 206 to a predetermined voltage level for detecting the field current. The UP/DOWN counter 208 is controlled in its UP/DOWN counting operation by an output of the first flip-flop circuit 205 and derives a counted value therefrom as a certain number of bits. The field current limiting unit 2 further comprises a D/A converter 209 for deriving an output which is proportional to the counted value of the UP/DOWN counter 208, a second comparator 210 for comparing the output of the D/A converter 209 with the output of the non-inverting amplifier 207, and a second flip-flop circuit 211 for accepting an output of the second comparator 210. The NOR gate 212 performs an inclusive-OR operation or the logical sum of outputs of the first flip-flop circuit 205 and the second flip-flop circuit 211, and controls the conduction of power transistor 213 which interrupts the field current. Numeral 214 designates a timing pulse generator which generates one shot pulses with a predetermined period for providing timing operations of the first flip-flop circuit 205, the second flip-flop circuit 211 and the UP/DOWN counter 208. Numeral 215 designates a suppression diode for absorbing a surge voltage generated when the power transistor is turned off. Numeral 3 designates a voltage regulation circuit consisting of a resistor 301 and a zener diode 302 for supplying an electric power to the field current control unit 2. Numeral 4 designates a battery, numeral 5 designates an electric load, numeral 6 is a key switch and numeral 7 is a warning lamp for charging.

FIGS. 2A-2F are timing diagram showing the waveforms at the various parts of the embodiment of the invention for illustrating the operation thereof. In FIGS. 2A-2F, 2A designates an output waveform of one shot pulses generated at the timing pulse generator 214 and 2B designates an input waveform to the second comparator 210 for limiting a field current, wherein (a) shows an output waveform of the non-inverting amplifier 207 proportioned to the field current whilst (b) shows an output waveform of the D/A converter 209. 2C designates an output waveform of the second flip-flop circuit 211 and 2D designates an input waveform to the first comparator 204 for detecting an output voltage of the generator 1, wherein (c) shows a voltage at a junction of the dividing resistors 201, 202 which divide the output voltage of the generator 1 whilst (d) shows a waveform of the standard voltage generated at the standard voltage generator 203. 2E designates an output waveform of the first flip-flop circuit 205 and 2F designates an output waveform of the power transistor 213. Further, in FIG. 2, the period T1 designates a steady-state voltage control period wherein the field current is stable, the period T2 designates a transition period wherein the field current is increasing, the period T3 designates a steady-state voltage control period after the field current has been increased and the point "a" designates a start point of increasing required field current.

FIGS. 3G-3J illustrates the characteristics of the embodiment of this invention when an electric load is applied, wherein 2G designates an output current waveform of the generator 1, 2H designates a field current waveform, 2I designates a driving torque of the generator 1 and 2J designates a variation of the rotating speed of the engine. Further, in FIGS. 3G-3J, the solid line shows the characteristics of the preferred embodiment of this invention, the interrupted line shows the characteristics of the prior art system and the point "b" designates a time when the electric load is increased.

The operation of the preferred embodiment of this invention will now be described more in detail. When the engine is started and the generator 1 is in the state of generating voltage, an output voltage of the generator 1 and a field current are detected within one period of the one shot pulse output (shown in FIG. 2A) of the timing pulse generator 214. Initially, the first and the second flip-flop circuits 205, 211 are set to an "L" level by the first one shot pulse and in turn the power transistor 213 is brought into conduction through the NOR gate 212. The output of the generator 1 is detected continuously by means of the voltage detector comprised of the dividing resistors 201, 202, the standard voltage generator 203 and the first comparator 204. Secondly, the field current detection by the field current detecting resistor 206 is commenced with the conduction of the power transistor 213. The detected field current, after being amplified by the non-inverting amplifier 207, is compared at the second comparator 210 with an output of the D/A converter 209, which determines the limiting value of the field current, for deriving a compared output therefrom. Under such condition as described above, if the voltage at the junction of the dividing resistors 201, 202, which is a divided output voltage of the generator 1, exceeds the preset voltage of the standard voltage generator 203, the output of the first comparator 204 is inverted and then the first flip-flop circuit 205 is flipped from an "L" level to a "H" level whilst the second flip-flop circuit 211 is flipped from and "L" level to a "H" level when an output of the non-inverting amplifier 207, which is proportional to the field current, exceeds the output of the D/A converter 209. The NOR gate 212 detects the change of level from the "L" level to the "H" level caused at either of the first and second flip-flop circuits 205, 211 and turns off the conduction of the power transistor 213, which is then kept off until the arrival of next timing pulse. Since an output of the first flip-flop circuit 205 is fed continuously to the UP/DOWN counter 208, if the output level is changed from the "L" level to the "H" level within one period of the timing pulses, there is executed a down count from the next timing pulse and then a certain amount of value is decreased from the output of the D/A converter 209. On the other hand, if the output level is remained at the "L" level, there is executed an up count and then a certain amount of value is added to the output of the D/A converter 209.

As described above, in accordance with the preferred embodiment of this invention, by providing a feed back loop for varying the limiting value of the field current successively depending upon the state of the output voltage within one period of the timing pulses, a steady-state voltage control operation when the required field current of the generator 1 is constant will become an alternate turn on/off operation of the power transistor 213 through the detection of the output voltage (through the first flip-flop circuit 205) and through the detection of the field current (through the second flip-flop circuit 211). Further, since an amount of change in counting at the UP/DOWN counter 208 is so selected as to increase or decrease the output of the D/A converter 209 successively, there is provided a stable output voltage whereby the limiting value for the field current is substantially balanced with the required field current.

When the required field current is increased from that of the aforesaid steady-state voltage control operation (FIGS. 2A-2F point "a"), the output of the generator 1 will drop instantly and then the output of the first flip-flop circuit 205 will be kept at a low "L" level. Therefore, the UP/DOWN counter 208 is incremented, increasing the output of the D/A converter 209 and attendantly increasing the field current limiting value. The rise time of the field current caused by the increase of the output voltage of the D/A converter 209 is selected to be longer than the time constant of the field coil 102, and the field current limiting value at the time when the required field current is increased (FIGS. 2A-2F point "a") is balanced with the value of the field current (FIGS. 2A-2F period T1). Thereafter the field current is increased gradually during the period T2, under the control of successive field current limiting value increases. Hence, upon reaching the required amount of field current and the set voltage for the output of the generator 1, a steady-state voltage control operation is again provided which is similar to that of the period T1 and the an output voltage is maintained constant (FIGS. 2A-2F period T3).

Figure 3G:
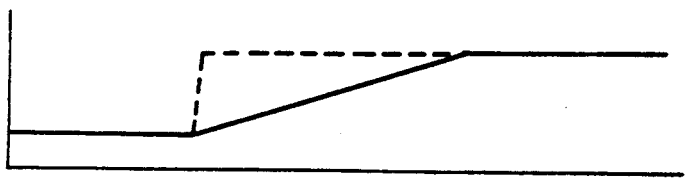
FIGS. 3G-3J are a timing diagram showing the characteristic curves illustrating the difference between the characteristics of the control devices in accordance with this invention and the prior art.
Figure 3H:
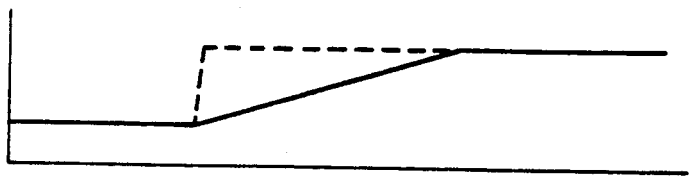
Figure 3I:
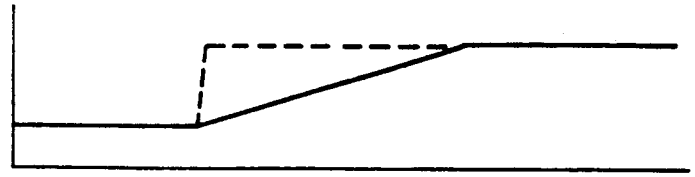
Figure 3J:
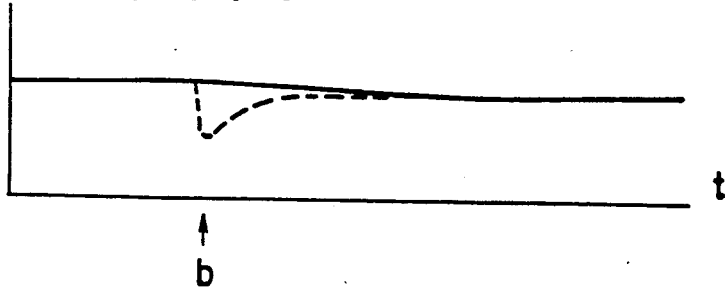

As it is shown by the solid line in FIGS. 3G-3J, the increasing of the field current in accordance with the preferred embodiment of the invention (FIG. 3H) is much slower than that of the prior art system (shown by interrupted line in FIG. 3H). As the three of a field current, an output current and a driving torque of the generator 1 at a constant rotary speed are proportional to each other, the output curent and the driving torque of the generator 1 show similar characteristics to that of the field current as indicated by solid lines in FIG. 3G, I respectively. Because of the gradual increase of the driving torque, an abrupt change of rotational speed of the engine is suppressed as is clear from FIG. 3J.

As described above, in accordance with the present invention, the field current is controlled by the voltage control means and the field current limiting means, and since the field current limiting value for the field current limiting means is controlled by the output of the generator, the field current limiting means is brought into operation upon an increase of the required field current for suppressing an abrupt change of driving power of the generator when an electric load of the vehicle is applied thereon and in turn suppressing an abrupt change of the rotational speed of the engine.

Although the present invention has been described in detail with reference to the preferred embodiment, it should be understood by those skilled in the art that various changes may be made and equivalents may be substituted for elements thereof without departing from the scope of the invention. Therefore, it is intended that the invention is not limited to the particular embodiment disclosed as the best mode contemplated for carrying out the invention, but the invention will include all embodiments falling within the scope of the appended claims.

What is claimed is:

1. A control device for a motor vehicle engine driven alternating current generator, comprising: voltage detecting means for detecting an output voltage of said generator, voltage control means for ON and OFF controlling a switching element which performs field current switching of said generator based on a detected signal obtained by comparing an output of the voltage detecting means with a standard voltage,
    field current detecting means for detecting the field current;
    field curent limiting means for controlling the switching element based on a detected signal obtained by comparing an output of the field current detecting means with a predetermined field current limiting value; and
    field current limiting value control means for successively varying the field current limiting value based on the output of the voltage detecting means, wherein said field current limiting value control means includes a D/A converter and an UP/-DOWN counter the counting direction of which is controlled by the state of the output of the voltage detecting means.

2. A control device for a motor vehicle engine driven alternating current generator as defined in claim 1, wherein said field current detecting means includes a resistor connected in series with a field coil of the alternating current generator.

3. A control device for a motor vehicle engine driven alternating current generator as defined in claim 1, wherein said field current limiting means includes a comparator and a flip-flop circuit to provide a pulse duration control signal to the switching element.

4. A control device for a motor vehicle engine driven alternating current generator as defined in claim 1, wherein said switching element is switched alternatively by the outputs of the voltage control means and the field current limiting means.

5. A control device for a motor vehicle engine driven alternating current generator as defined in claim 1, wherein said switching element is a power transistor.

6. A control device for a motor vehicle engine driven alternating current generator as defined in claim 2, wherein a voltage across the detecting resistor is fed to a non-inverting amplifier for deriving an output therefrom to compare with the field current limiting value.

7. A control device for a motor vehicle engine driven alternating current generator, comprising: voltage detecting means for detecting an output voltage of said generator, voltage control means for ON and OFF controlling a switching element which performs field current switching of said generator based on a detected signal obtained by comparing an output of the voltage detecting means with a standard voltage,
    field current detecting means for detecting the field current;
    field current limiting means for controlling the switching element based on a detected signal obtained by comparing an output of the field current detecting means with a predetermined field current limiting value; and
    field current limiting value control means for successively varying the field current limiting value based on the output of the voltage detecting means, wherein said switching element is switched alternately by outputs of the voltage control means and the field current limiting means.

8. A control device for a motor vehicle engine driven alternating current generator as defined in claim 1, wherein said field current detecting means includes a resistor connected in series with a field coil of the alternating current generator.

9. A control device for a motor vehicle engine driven alternating current generator as defined in claim 7, wherein said field current limiting means includes a comparator and a flip-flop circuit to provide a pulse duration control signal to the switching element.

10. A control device for a motor vehicle engine driven alternating current generator as defined in claim 7, wherein said switching element is a power transistor.

11. A control device for a motor vehicle engine driven alternating current generator as defined in claim 8, wherein a voltage across the detecting resistor is fed to a non-inverting amplifier for deriving an output therefrom to compare with the field current limiting value.

12. A control device for a motor vehicle engine driven alternating current generator, comprising: voltage detecting means for detecting an output voltage of said generator, voltage control means for ON and OFF controlling a switching element which performs field current switching of said generator based on a detected signal obtained by comparing an output of the voltage detecting means with a standard voltage,
    field current detecting means for detecting the field current;
    field current limiting means for controlling the switching element based on a detected signal obtained by comparing an output of the field current detecting means with a predetermined field current limiting value; and field current limiting value control means for successively varying the field current limiting value based on the output of the voltage detecting means, wherein said field current limiting value control means includes a D/A converter and an UP-/DOWN counter the counting direction of which is controlled by the state of the output of the voltage detecting means, wherein said field current detecting means includes a resistor connected in series with a field coil of the alternating current generator, and wherein a voltage across the detecting resistor is fed to a non-inverting amplifier for deriving an output therefrom to compare with the field current limiting value.

13. A control device for a motor vehicle engine alternating current generator as defined in claim 13, wherein said field current limiting means includes a comparator and a flip-flop circuit to provide a pulse duration control signal to the switching element.

14. A control device for a motor vehicle engine alternating current generator as defined in claim 12, wherein said switching element is a power transistor.

* * * * *